(12) United States Patent
Hoffmann

(10) Patent No.: US 11,746,911 B2
(45) Date of Patent: Sep. 5, 2023

(54) FLUID VALVE DEVICE AND METHOD FOR OPERATING A FLUID VALVE DEVICE

(71) Applicant: AUDI AG, Ingolstadt (DE)

(72) Inventor: Thomas Hoffmann, Riedenburg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/264,960

(22) PCT Filed: Oct. 17, 2019

(86) PCT No.: PCT/EP2019/078193
§ 371 (c)(1),
(2) Date: Feb. 1, 2021

(87) PCT Pub. No.: WO2020/094355
PCT Pub. Date: May 14, 2020

(65) Prior Publication Data
US 2021/0310568 A1 Oct. 7, 2021

(30) Foreign Application Priority Data
Nov. 8, 2018 (DE) .................... 10 2018 219 098.4

(51) Int. Cl.
*F16K 5/04* (2006.01)
*F16K 11/16* (2006.01)
*F01P 7/14* (2006.01)

(52) U.S. Cl.
CPC .......... *F16K 5/0442* (2013.01); *F16K 11/165* (2013.01); *F01P 2007/146* (2013.01)

(58) Field of Classification Search
CPC .... F16K 5/0442; F16K 11/165; F16K 31/535; F01P 2007/146
See application file for complete search history.

(56) References Cited

U.S. PATENT DOCUMENTS

| 10,808,863 B2 * | 10/2020 | Bugeja .................. F16K 11/165 |
| 2010/0282190 A1 | 11/2010 | Stoermer |
| 2012/0048217 A1 | 3/2012 | Triebe et al. |
| 2015/0027575 A1 | 1/2015 | Morein |

(Continued)

FOREIGN PATENT DOCUMENTS

| CN | 102414415 A | 4/2012 |
| CN | 103114902 A | 5/2013 |

(Continued)

OTHER PUBLICATIONS

Notification of Transmittal of Translation of the International Preliminary Report on Patentability dated May 20, 2021, in connection with corresponding International Application No. PCT/EP2019/078193; 10 pages.

(Continued)

*Primary Examiner* — Reinaldo Sanchez-Medina
(74) *Attorney, Agent, or Firm* — Maier & Maier, PLLC

(57) ABSTRACT

A fluid valve device. A first rotary slide valve, a second rotary slide valve, and a servomotor are provided. Each of the rotary valves has a rotary slide arranged in a rotary slide housing and drivable via a drive shaft by the servomotor. The first rotary slide valve is rigidly coupled and the second rotary slide valve is coupled via a freewheel to the drive shaft.

19 Claims, 2 Drawing Sheets

(56) References Cited

U.S. PATENT DOCUMENTS

| | | | |
|---|---|---|---|
| 2015/0354714 A1* | 12/2015 | Morein | F16K 11/076 137/625.46 |
| 2016/0341331 A1 | 11/2016 | Lueders et al. | |
| 2020/0248836 A1* | 8/2020 | Bugeja | F16K 31/535 |

FOREIGN PATENT DOCUMENTS

| | | |
|---|---|---|
| CN | 104769514 A | 7/2015 |
| CN | 105452627 A | 3/2016 |
| CN | 105473835 A | 4/2016 |
| CN | 105723064 A | 6/2016 |
| DE | 28 05 692 A1 | 8/1979 |
| DE | 103 29 469 A1 | 1/2005 |
| DE | 10 2009 020 187 A1 | 11/2010 |
| DE | 10 2009 033 585 A1 | 1/2011 |
| DE | 10 2011 119 237 A1 | 5/2013 |
| DE | 10 2013 010 536 B3 | 8/2014 |
| DE | 10 2016 102 583 A1 | 8/2017 |
| DE | 10 2017 209 481 A1 | 12/2018 |
| DE | 10 2017 218 864 B3 | 2/2019 |
| EP | 0246359 A2 | 11/1987 |
| EP | 3 232 102 A1 | 10/2017 |
| WO | 2015/030944 A1 | 3/2015 |
| WO | 2015/034576 A1 | 3/2015 |
| WO | 2017217112 A1 | 12/2017 |

OTHER PUBLICATIONS

International Search Report dated Jan. 22, 2020 in corresponding International application No. PCT/EP2019/078193; 8 pages.

Written Opinion of the International Searching Authority dated Jan. 22, 2020 in corresponding International application No. PCT/EP2019/078193; 14 pages including Machine-generated English-language translation.

Chinese Office Action, dated Jun. 6, 2022, in corresponding Chinese Application No. 201980059792.0; 14 pages.

Examination Report dated Oct. 20, 2022, in connection with corresponding German Application No. 102018219098.4 (12 pp., including machine-generated English translation).

Third Office Action dated Apr. 24, 2023, in corresponding Chinese Application No. 201980059792.0, 14 pages.

* cited by examiner

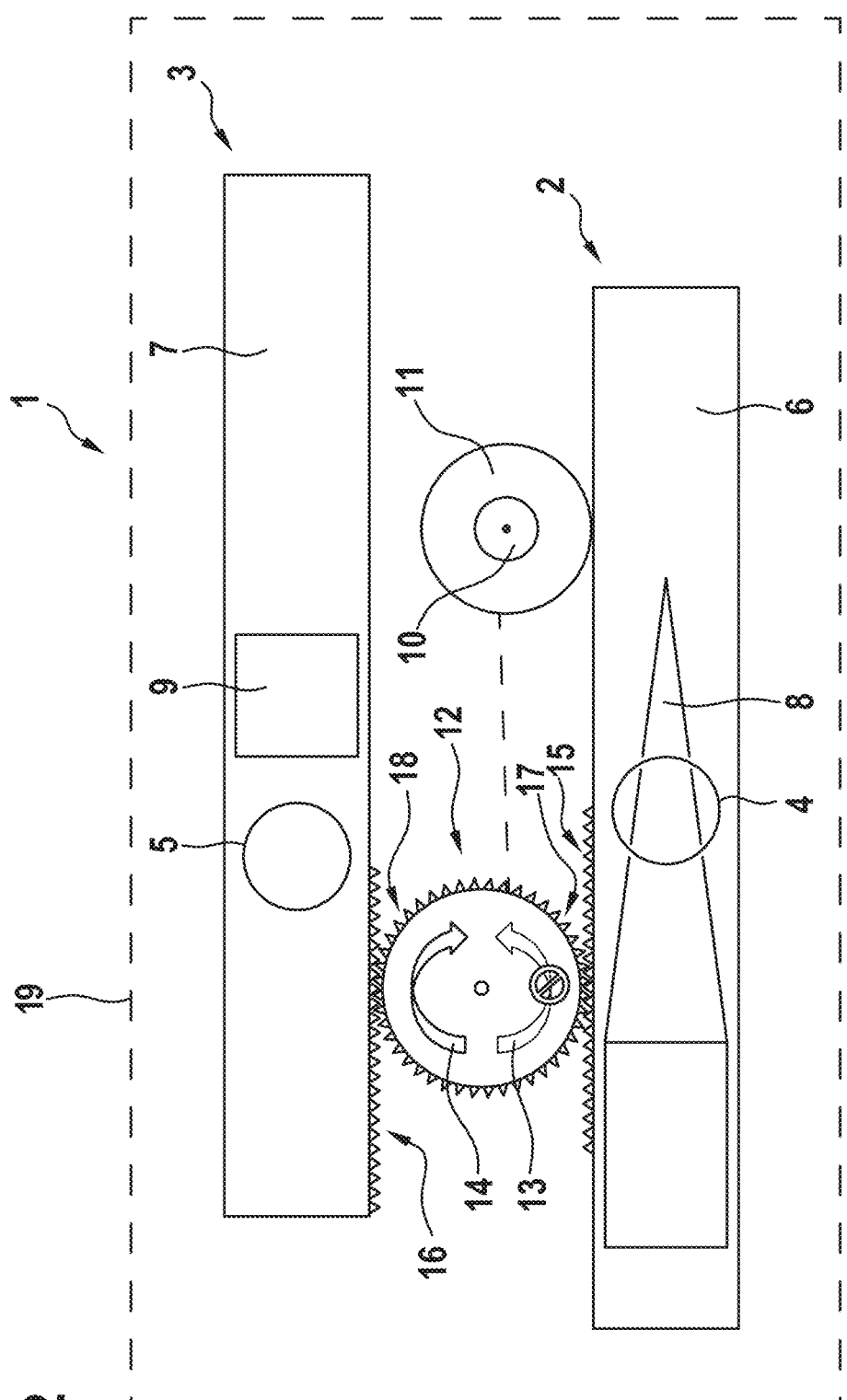

FLUID VALVE DEVICE AND METHOD FOR OPERATING A FLUID VALVE DEVICE

FIELD

The disclosure relates to a fluid valve device and a method for operating such a fluid valve device.

BACKGROUND

Document DE 10 2015 004 119 A1 is known from the prior art, for example. This describes a valve which has two valve members which are arranged in a valve housing and which can be actuated by an actuating rod which can be driven by means of an electrodynamic drive device. The electrodynamic drive device contains a coil device which is seated coaxially and at the same time axially fixed on the actuating rod, so that the actuating rod moves linearly in its longitudinal direction for actuating the valve members.

SUMMARY

It is the object of the invention to propose a fluid valve device which has advantages over known valve devices, in particular enables multiple valves to be set independently in a simple and flexible manner.

This object is achieved according to the disclosure by a method for operating a fluid valve device. A first rotary slide valve, a second rotary slide valve, and a servomotor are provided, wherein each of the rotary slide valves has a rotary slide arranged in a rotary slide housing and drivable via a drive shaft by means of the servomotor, wherein the first rotary slide valve is rigidly coupled and the second rotary slide valve is coupled to the drive shaft via a freewheel.

The fluid valve device is used to set a flow cross-sectional area, that is to say the size of a flow cross section, between at least one fluid inlet and at least one fluid outlet of the valve device. For example, the valve device has at least as many fluid outlets as there are fluid inlets, wherein each of the fluid inlets is associated with at least one of the fluid outlets or multiple of the fluid outlets. It can therefore be provided that the flow cross-sectional area between exactly one fluid inlet and exactly one fluid outlet or the respective flow cross-sectional area between each of the fluid inlets and the associated at least one of the fluid outlets can be set with the aid of the valve device.

The valve device particularly preferably has one fluid inlet and multiple fluid outlets associated with this fluid inlet, wherein the fluid provided at the fluid inlet is supplied to none of the fluid outlets, exclusively to a single one of the fluid outlets, or to multiple of the fluid outlets, depending on a setting of the valve device. This means that depending on the setting of the valve device, a specific flow cross-sectional area is set between the fluid inlet and each of the fluid outlets, which in each case differs from zero, but can also be zero to block the respective fluid connection between the fluid inlet and the corresponding fluid outlet.

The valve device has multiple rotary slide valves, namely the first rotary slide valve and the second rotary slide valve, for setting the flow cross-sectional area between the respective fluid inlet and the respective fluid outlet. Each of these rotary slide valves in turn has a rotary slide which is arranged in the respective rotary slide housing. The rotary slide housing of the rotary slide can of course also be configured as a common rotary slide housing 19, as shown in exemplary FIGS. 1 and 2. The rotary slide is mounted in the rotary slide housing 19 so that it is rotatable around an axis of rotation.

Each of the rotary slide valves has at least one inlet and at least one outlet. Depending on the rotational angle position of the rotary slide in the rotary slide housing, there is a certain flow cross-sectional area between the inlet and the outlet. It can now be provided, for example, that the inlets of the rotary slide valves are fluidically connected to separate fluid inlets of the valve device fluidically independently of each other, and similarly thereto the outlets of the rotary slide valves are fluidically connected to fluid outlets of the valve device fluidically independently of each other.

However, it can also be provided that the inlets of the rotary slide valves are each fluidically connected to the one fluid inlet of the valve device, so that the rotary slide valves are each connected on the inlet side to the fluid inlet of the valve device. The outlets of the rotary slide valves are preferably each fluidically connected to fluid outlets of the valve device independently of one another, in particular each of the outlets to exactly one of the fluid outlets. Of course, it can also be provided here that the outlets of multiple of the rotary slide valves or all rotary slide valves are fluidically connected to one of the fluid outlets or to the one fluid outlet of the valve device, respectively.

For example, in a first rotational angle position of the rotary slide, there is a fluid connection having a first flow cross-sectional area between the respective inlet and the respective outlet, whereas in a second rotational angle position, the fluid connection is present having a second flow cross-sectional area different from the first flow cross-sectional area. For example, in the first rotational angle position of the rotary slide there is a fluid connection having a first flow cross-sectional area between the fluid inlet and a first of the fluid outlets, whereas a second of the fluid outlets is fluidically decoupled from the fluid inlet. In the second rotational angle position, however, the first fluid outlet is fluidically decoupled from the fluid inlet, whereas the second of the fluid outlets has a fluidic connection to the fluid inlet having a specific second flow cross-sectional area. The first flow cross-sectional area and the second flow cross-sectional area can have the same value or they can be different from one another here.

It can therefore be provided that the multiple rotary slide valves are fluidically connected to the same fluid inlet of the valve device, so that the fluid provided at the fluid inlet can be distributed to multiple fluid outlets with the aid of the rotary slide valves. However, it can also be provided that each of the rotary slide valves has a separate fluid inlet, so that the above statements can be used for each of the rotary slide valves or each of the rotary slides.

The setting of the valve device, that is to say the actuation or rotation of the rotary slides within the rotary slide housing, is carried out by means of the servomotor. The drive shaft, via which the servomotor can drive the respective rotary slide, is connected to the servomotor, in particular to a motor shaft of the servomotor. The servomotor is preferably provided as an electric motor. However, other types of motors can in principle also be used.

The rotary slides of the rotary slide valves are drivable, in particular are drivable selectively, by means of the servomotor, that is to say the same servomotor. For this purpose, the drive shaft is rigidly coupled to the first rotary slide valve or the rotary slide of the first rotary slide valve. The second rotary slide valve or the rotary slide valve of the second rotary slide valve is, however, coupled to the drive shaft via the freewheel, that is to say only indirectly. This means that a rotational movement of the drive shaft is always transmitted to the first rotary slide valve regardless of a rotational direction of the drive shaft. The coupling between the second rotary slide valve and the drive shaft, on the other hand, depends on the rotational direction of the drive shaft. In a first rotational direction of the drive shaft, the freewheel establishes a rigid connection between the drive shaft and the second rotary slide valve. In a second rotational direction opposite to the first rotational direction, on the other hand, the freewheel decouples the second rotary slide valve from the drive shaft.

In the first rotational direction, the second rotary slide valve is coupled in a rotationally-fixed manner to the drive shaft, so that the rotary slide of the second rotary slide valve can be or is displaced by means of the servomotor. If the second rotational direction is present, i.e., if the second rotary slide valve is decoupled from the drive shaft, it remains in its currently present rotational angle position even upon a rotational movement of the servomotor and therefore the drive shaft. In other words, the rotary slide of the second rotary slide valve is present in a rotationally-fixed manner in the rotary slide housing if or as long as it is decoupled from the drive shaft. For this purpose, there is sufficient friction between the rotary slide and the rotary slide housing, for example.

If only one rotary slide valve and/or one rotary slide is referred to in this description, the corresponding statements can be transferred to all rotary slide valves and/or rotary slide valves of the fluidic fluid device, in particular if not otherwise indicated. Numerous advantages can be achieved using the described configuration of the fluid valve device. Thus, the rotary slide valves can be set independently of one another, namely by displacing the rotary slide of the first rotary slide valve independently of the rotary slide of the second rotary slide valve.

In addition, only the common servomotor is provided for the implemented, flexible displacement or rotation of the rotary slide, which is in particular provided as the only servomotor of the fluid device. There is thus no further servomotor provided, by means of which the rotary slides are drivable. The alternate driving of the rotary slide valve is carried out in a structurally simple manner, namely by using the freewheel.

The mounting of the rotary slides of the rotary slide valves in the rotary slide housing or the respective rotary slide housing can in principle be configured as desired. For example, the rotary slides are mounted radially on the drive shaft and axially by means of at least one sealing assembly which cooperates in a sealing manner with the rotary slides. Radial and axial mounting by means of these sealing assemblies can also be implemented. The sealing assemblies are preferably acted upon by spring force in the direction of the respective rotary slide, so that tolerances are or can be compensated for.

A preferred further embodiment of the invention provides that the freewheel is coupled to the drive shaft directly or only indirectly via the first rotary slide valve. On the input side, the freewheel is connected directly, as shown in exemplary FIG. 2, or indirectly, as shown in exemplary FIG. 1, to the drive shaft or coupled to it. On the output side, it is coupled to the second rotary slide valve, wherein this coupling can also be direct or indirect. However, on the output side, the freewheel preferably engages directly on the second rotary slide valve or its rotary slide. If the freewheel is coupled directly to the drive shaft, it is driven directly by the drive shaft, but at least not via the first rotary slide valve or its rotary slide.

In the case of the indirect coupling, the freewheel has a drive connection to the drive shaft via the first rotary slide valve or its rotary slide. This means that a rotational movement of the drive shaft is transmitted to the second rotary slide valve only via the first rotary slide valve or the rotary slide of the first rotary slide valve. The described configuration of the fluid valve device is technically easy to implement and can be implemented cost-effectively.

It is provided in the scope of a further preferred embodiment of the invention that the first rotary slide valve has a first coupling device and the second rotary slide valve has a second coupling device, wherein the first coupling device and the second coupling device are each coupled to the freewheel. The only indirect connection of the freewheel to the drive shaft is thus implemented via the two coupling devices, that is to say the first coupling device and the second coupling device. For this purpose, the freewheel engages on the first rotary slide valve on the input side via the first coupling device. On the output side, the freewheel is coupled to the second rotary slide valve via the second coupling device. The coupling devices can in principle each be designed as desired. Particularly preferably, they each have gear teeth or are provided in the form of gear teeth. The use of the coupling devices enables a particularly simple construction of the valve device and a reliable connection of the rotary slide valves to the drive shaft.

One refinement of the invention provides that the first coupling device is coupled to an input of the freewheel coupled to the drive shaft and the second coupling device is coupled to an output of the freewheel. In other words, the freewheel is connected on the input side to the drive shaft via the first coupling device and on the output side to the second rotary slide valve via the second coupling device. This means that the second rotary slide valve or its rotary slide is connected to the drive shaft exclusively via the second coupling device, the freewheel, the first coupling device, and the first rotary slide valve.

In this way, a particularly high level of flexibility of the fluid valve device, in particular also with regard to the arrangement of the two rotary slide valves with respect to one another, is achieved. For example, the two rotary slide valves can be arranged coaxially to one another, so that the axes of rotation of their rotary slide valves coincide. Alternatively, it can also be provided that the rotary slide valves are arranged in such a way that the axes of rotation of their rotary slides are spaced apart in parallel to one another or are arranged skewed to one another.

A preferred further embodiment of the invention provides that the first coupling device is coupled to an input of the freewheel via the drive shaft or to the drive shaft via an input coupling device of the input of the freewheel. In the first case, the input of the freewheel is preferably connected directly to the drive shaft. In this case, the first coupling device is used, for example, to establish a direct connection between the drive shaft and the first rotary slide valve. The freewheel is thus is only indirectly coupled to the first rotary slide valve, namely via the drive shaft.

In the case of the coupling of the first coupling device to the drive shaft via the input coupling device, the first rotary slide valve is only indirectly connected to the drive shaft, namely via the input of the freewheel. This means that the freewheel is connected on the input side to both the drive shaft and the first rotary slide valve, so that a rotational movement of the drive shaft is transmitted to the input coupling device and via this to the first rotary slide valve or its rotary slide. The described configurations of the valve device enable a particularly flexible arrangement of the rotary slide valves with respect to one another.

A further embodiment of the invention provides that the first coupling device is at least temporarily coupled to the drive shaft and/or the input coupling device of the freewheel and the second coupling device is permanently coupled directly to an output coupling device of the freewheel. This means that the second rotary slide valve is permanently coupled to the freewheel, but the freewheel is not necessarily permanently connected to the drive shaft and/or the first rotary slide valve. For example, it can be provided that the freewheel is only temporarily driven on the input side by the servomotor via the drive shaft, in particular it is also used during this to drive the first rotary slide valve.

This means that a rotational movement of the drive shaft, which is directed toward driving the first rotary slide valve, is not used permanently, but only temporarily, to drive the freewheel on the input side. For example, the first coupling side and/or the input coupling device are configured accordingly for this purpose. If the first coupling device and/or the input coupling device are provided as gear teeth or have such gear teeth, the gear teeth can thus be interrupted in order to only temporarily drive the freewheel. This enables particularly flexible operation of the fluid valve device.

Finally, within the scope of a further preferred embodiment of the invention, it can be provided that the first coupling device, the second coupling device, the input coupling device, and the output coupling device each have gear teeth or are formed as such. At least one of the following devices is thus formed as gear teeth or has such gear teeth: first coupling device, second coupling device, input coupling device, and output coupling device. This only applies to those coupling devices that are actually present in the context of the fluid valve device. The use of the gear teeth enables a particularly reliable coupling of the rotary slide valves to the drive shaft.

The invention furthermore relates to a method for operating a fluid valve device, in particular a fluid valve device according to the statements in the context of this description. It is provided that the fluid valve device has a first rotary slide valve, a second rotary slide valve, and a servomotor, wherein each of the rotary slide valves has a rotary slide arranged in a rotary slide housing and drivable via a drive shaft by means of the servomotor, wherein the first rotary slide valve is coupled rigidly to the drive shaft and the second rotary slide valve is coupled to the drive shaft via a freewheel, and wherein the first rotary slide valve is set to a first setpoint value and the second rotary slide valve is set to a second setpoint value by means of the servomotor.

The advantages of such a procedure or such a configuration of the fluidic device have already been indicated. Both the fluid valve device for the motor vehicle and also the method for its operation can be refined according to the statements in the context of this description, to which reference will therefore be made.

Another embodiment of the invention provides that first the second rotary slide valve is set by rotating the drive shaft against a freewheeling direction of the freewheel and then the first rotary slide valve is set by rotating the drive shaft in the freewheeling direction. Each of the rotary slide valves is preferably continuously rotatable, that is to say can be rotated as desired in at least one rotational direction, in particular by more than 360°, in order to set the desired setpoint value. This achieves a particularly high degree of flexibility of the described method for operating the fluid valve device. This is because it is possible to first set the second rotary slide valve to the second setpoint value by rotating the drive shaft against the freewheeling direction of the freewheel.

This means that both the first rotary slide valve and the second rotary slide valve are driven and rotated against the freewheeling direction by means of the servomotor. The freewheeling direction is to be understood as the rotational direction of the freewheel in which an output of the freewheel is decoupled from its input, i.e., ultimately in which the second rotary slide valve is decoupled from the servomotor or the drive shaft. If the second rotary slide valve is at the second setpoint value, the first rotary slide valve is then—if necessary—set to the first setpoint value, namely by rotating the drive shaft in the freewheeling direction.

During this rotation of the drive shaft in the freewheeling direction, only the first rotary slide valve, but not the second rotary slide valve, is adjusted or rotated. Rather, the second rotary slide valve remains at the second setpoint value. The drive shaft is rotated in the freewheeling direction until the first rotary slide valve is also set to its setpoint value, namely the first setpoint value. The independent rotation of the two rotary slide valves from one another enables particularly flexible setting of the fluid valve device.

A further embodiment of the invention provides that, to set the second rotary slide valve to the second setpoint value, the servomotor is operated in such a way that the first rotary slide valve is alternately set in opposite directions to values deviating from the first setpoint value, until the second setpoint value for the second rotary slide valve is present. With such a procedure, first the first rotary slide valve is set to the first setpoint value. The second rotary slide valve is only then set to the second setpoint value. For this setting of the second rotary slide valve to the second setpoint value, after setting the first rotary slide valve to the first setpoint value, the drive shaft is rotated alternately in opposite directions by means of the servomotor, so that the first rotary slide valve also moves in opposite directions and is set to values deviating from the first setpoint value.

The drive shaft is rotated alternately in the freewheeling direction and against the freewheeling direction for this purpose. When the drive shaft is rotated in the freewheeling direction, the second rotary slide valve remains at its current setting. During the rotation of the drive shaft against the freewheeling direction, however, the second rotary slide valve is adjusted in the direction of the second setpoint value until it has reached the second setpoint value. The values deviating from the first setpoint value, to which the first rotary slide valve is alternately set during the setting of the second rotary slide valve to the second setpoint value, are preferably selected such that the effective flow cross-sectional area of the first rotary slide valve is not changed, or at most is only slightly changed.

The values are thus particularly preferably selected such that the flow cross-sectional area of the first rotary slide valve remains constant while the second rotary slide valve is being set to the second setpoint value. If this is not possible, a deviation of the flow cross-sectional area is preferably permitted to at most 25%, at most 20%, at most 15%, at most 10%, or at most 5% in relation to the flow cross-sectional area present at the first setpoint value. With the procedure described, after setting the first rotary slide valve to the first setpoint value, a step-by-step setting of the second rotary slide valve to the second setpoint value is achieved. Correspondingly, it is possible to set the two rotary slide valves completely independently of one another.

BRIEF DESCRIPTION OF THE FIGURES

In the following, the disclosure will be explained in greater detail with reference to the exemplary embodiments depicted in the drawings, without the disclosure being restricted.

FIG. 2 shows a schematic view of a fluid valve device having a first rotary slide valve and a second rotary slide valve which are coupled to one another by a freewheel.

DETAILED DESCRIPTION

Figure 1:
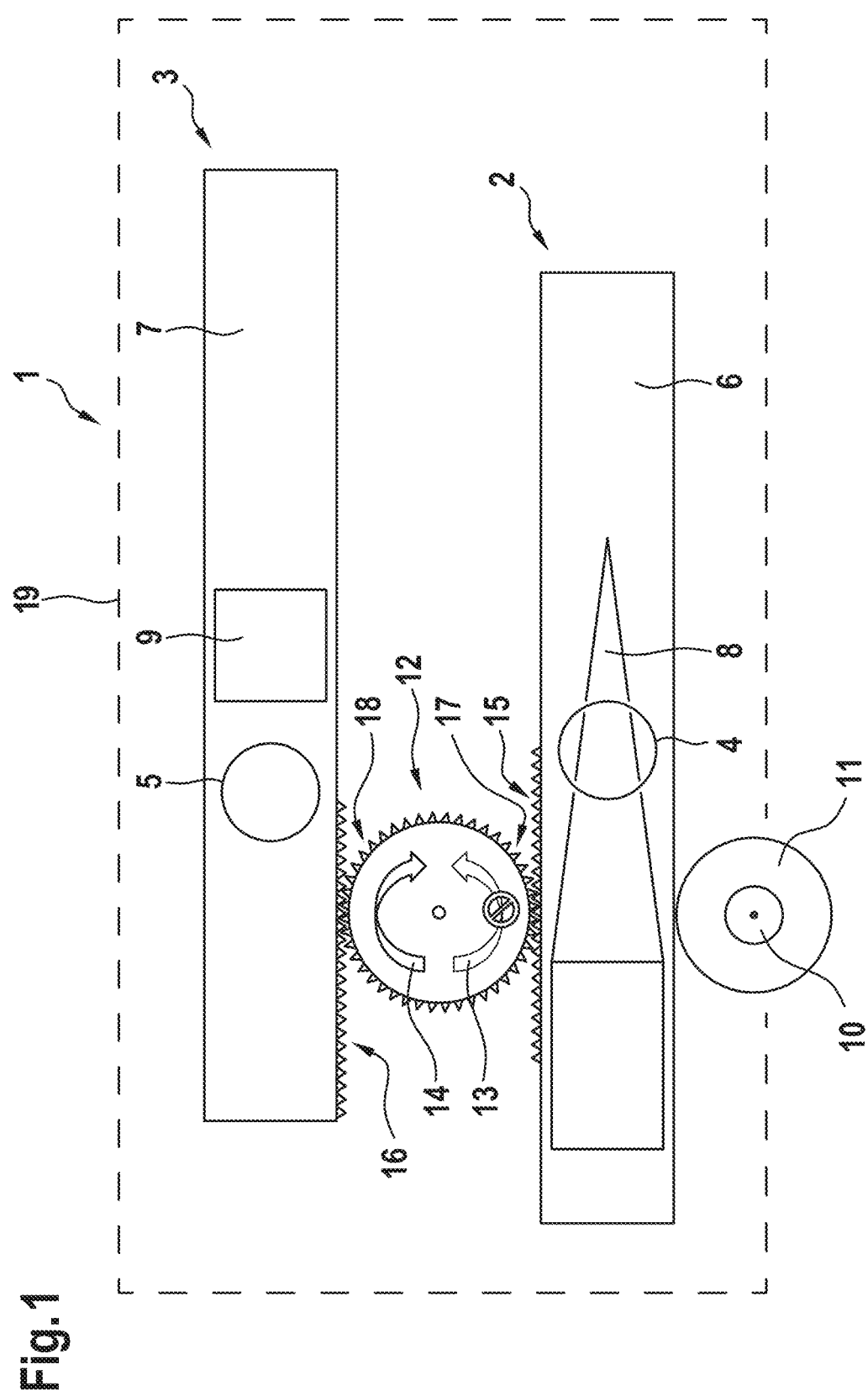
FIG. 1 shows a schematic view of a fluid valve device having a first rotary slide valve and a second rotary slide valve which are coupled to one another by a freewheel.

The figures show a schematic representation of a fluid valve device 1, which has a first rotary slide valve 2 and a second rotary slide valve 3. Of the rotary slide valves 2 and 3, only one inlet 4 and 5 and one rotary slide 6 and 7, respectively, are shown, wherein the rotary slides 6 and 7 or shown in an unrolled form in the circumferential direction. This means that, of the rotary slides 6 and 7, only an outer lateral surface is shown over the entire circumference of the respective rotary slide 6 or 7, respectively.

In the rotary slide 6 there is a positioning opening 8 and in the rotary slide 7 there is a positioning opening 9. In principle, these can be designed as desired. In the exemplary embodiment shown here, the positioning openings 8 and 9 are formed having different shapes. However, they can also have the same shape. Depending on an overlap of the inlet 4 with the positioning opening 8 or of the inlet 5 with the positioning opening 9, respectively, a specific flow cross section or a specific flow cross-sectional area is set for the respective rotary slide valve 2 or 3. The greater the overlap between the inlet 4 and the positioning opening 8 or the inlet 5 and the positioning opening 9, respectively, the larger the flow cross section or the corresponding flow cross-sectional area available for the respective rotary slide valve 2 or 3.

According to the exemplary embodiment shown in FIG. 1, the first rotary slide valve 2 or the rotary slide 6 of the first rotary slide valve 2 can be driven directly by means of a servomotor 10, namely via a drive shaft 11 which is coupled on the one hand to the servomotor 10 and on the other hand to the rotary slide 6. For example, the drive shaft 11 engages on the rotary slide 6 via gear teeth (not shown here). The first rotary slide valve 2 or its rotary slide 6 is thus rigidly coupled to the drive shaft 11. The second rotary slide valve 3 or its rotary slide 7, however, is only indirectly coupled to the drive shaft 11 via a freewheel 12.

In the exemplary embodiment shown here, the second rotary slide valve 3 is coupled via the freewheel 12 to the first rotary slide valve 12 and via this in turn to the drive shaft 11. An arrow 13 indicates a freewheeling direction of the freewheel 12 and an arrow 14 indicates the rotational direction opposite to the freewheeling direction. Because of the freewheel 12 present between the rotary slide valves 2 and 3, only a rotational movement of the first rotary slide valve 2 against the freewheeling direction of the freewheel 12 is transmitted to the second rotary slide valve 3. A rotational movement of the first rotary slide valve 2 in the freewheeling direction does not cause any rotational movement of the rotary slide valve 3, so that it remains stationary.

To couple the rotary slide valves 2 and 3 to the freewheel 12, the first rotary slide valve 2 has a first coupling device 15 and the second rotary slide valve 3 has a second coupling device 16. In the exemplary embodiment shown here, these are in the form of gear teeth. These are, for example, arranged offset from one another in the axial direction with respect to an axis of rotation of the freewheel 12. The coupling devices 15 and 16 can in principle be designed as desired, in particular provided in the form of shafts that connect each of the rotary slide valves 2 and 3 to the freewheel 12. The coupling devices 15 and 16 are connected to one another via the freewheel 12 in such a way that upon a rotational movement of the coupling devices 15 and 16 relative to one another in one direction, there is a coupling between them and they are decoupled from one another upon a rotational movement in a direction opposite to the direction. To couple the first rotary slide valve 2 to the freewheel 12, the first coupling device 15 interacts with an input coupling device 17 of the freewheel.

To couple the freewheel 12 to the second rotary slide valve 3, however, the second coupling device 16 interacts with an output coupling device 18 of the freewheel 12. The coupling devices 17 and 18 are also in the form of gear teeth, for example. Correspondingly, the gear teeth of the first coupling device 15 mesh with the gear teeth of the input coupling device 17 and the gear teeth of the second coupling device 16 mesh with the gear teeth of the output coupling device 18. The input coupling device 17 and the output coupling device 18 have a drive connection to one another in order to implement the freewheel 12 in such a way that during a rotational movement in relation to one another in one direction, there is a coupling. In the case of a direction opposite to the direction, however, they are decoupled from one another.

In the context of an operating method of the fluid valve device 1, it is particularly preferred to first set the first rotary slide valve 2 to a first setpoint value by means of the servomotor 10. The second rotary slide valve 3 is then set to a second setpoint value by alternately driving the first rotary slide valve 2 in opposite directions by means of the servomotor 10. This means that the first rotary slide valve 2 is alternately set to values that deviate from the first setpoint value, whereby a step-by-step adjustment of the second rotary slide valve 3 is achieved in the direction of the second setpoint value. The values deviating from the first setpoint value are preferably selected in such a way that a flow cross-sectional area of the first rotary slide valve 2 present at the first setpoint value is not changed or is at most changed insignificantly.

Using the described configuration of the fluid valve device and—preferably—the described operating method, particularly flexible setting of the rotary slide valves 2 and 3 is possible, essentially independently of one another.

The invention claimed is:

1. A fluid valve device, comprising: a first rotary slide valve, a second rotary slide valve, and a servomotor, wherein each of the rotary valves has a rotary slide arranged in a rotary slide housing and drivable via a drive shaft by the servomotor, wherein the first rotary slide valve is rigidly coupled to the drive shaft and the second rotary slide valve is coupled via a freewheel to the drive shaft, wherein the freewheel engages the second rotary slide valve throughout rotation of the drive shaft in a first direction and wherein the freewheel decouples from the second rotary slide valve throughout rotation of the drive shaft in a second direction, and wherein the freewheel is coupled to the drive shaft only indirectly via the first rotary slide valve.

2. The fluid valve device according to claim 1, wherein the first rotary slide valve has a first coupling device and the second rotary slide valve has a second coupling device, wherein the first coupling device and the second coupling device are each coupled to the freewheel.

3. The fluid valve device according to claim 2, wherein the first coupling device is coupled to an input of the freewheel coupled to the drive shaft and the second coupling device is coupled to an output of the freewheel.

4. The fluid valve device according to claim 2, wherein the first coupling device is coupled via the drive shaft to the input of the freewheel or is coupled via an input coupling device of the input of the freewheel to the drive shaft.

5. The fluid valve device according to claim 2, wherein the first coupling device is at least temporarily coupled to the drive shaft and/or the input coupling device of the freewheel and the second coupling device is permanently coupled directly to an output coupling device of the freewheel.

6. The fluid valve device according to claim 5, wherein the first coupling device, the second coupling device, the input coupling device, and the output coupling device each have gear teeth or are formed as such.

7. The fluid valve device according to claim 1, wherein the first rotary slide valve has a first coupling device and the second rotary slide valve has a second coupling device, wherein the first coupling device and the second coupling device are each coupled to the freewheel.

8. The fluid valve device according to claim 7, wherein the first coupling device is coupled to an input of the freewheel coupled to the drive shaft and the second coupling device is coupled to an output of the freewheel.

9. The fluid valve device according to claim 7, wherein the first coupling device is at least temporarily coupled to the drive shaft and/or the input coupling device of the freewheel and the second coupling device is permanently coupled directly to an output coupling device of the freewheel.

10. The fluid valve device according to claim 8, wherein the first coupling device is coupled via the drive shaft to the input of the freewheel or is coupled via an input coupling device of the input of the freewheel to the drive shaft.

11. The fluid valve device according to claim 8, wherein the first coupling device is at least temporarily coupled to the drive shaft and/or the input coupling device of the freewheel and the second coupling device is permanently coupled directly to an output coupling device of the freewheel.

12. The fluid valve device according to claim 7, wherein the first coupling device is coupled via the drive shaft to the input of the freewheel or is coupled via an input coupling device of the input of the freewheel to the drive shaft.

13. The fluid valve device according to claim 3, wherein the first coupling device is coupled via the drive shaft to the input of the freewheel or is coupled via an input coupling device of the input of the freewheel to the drive shaft.

14. The fluid valve device according to claim 3, wherein the first coupling device is at least temporarily coupled to the drive shaft and/or the input coupling device of the freewheel and the second coupling device is permanently coupled directly to an output coupling device of the freewheel.

15. The fluid valve device according to claim 4, wherein the first coupling device is at least temporarily coupled to the drive shaft and/or the input coupling device of the freewheel and the second coupling device is permanently coupled directly to an output coupling device of the freewheel.

16. The fluid valve device according to claim 2, wherein the first coupling device is coupled to an input of the freewheel coupled to the drive shaft and the second coupling device is coupled to an output of the freewheel.

17. A method for operating a fluid valve device, wherein the fluid valve device has a first rotary slide valve, a second rotary slide valve, and a servomotor, wherein each of the rotary slide valves has a rotary slide arranged in a rotary slide housing and drivable via a drive shaft by the servomotor, wherein the first rotary slide valve is rigidly coupled and the second rotary slide valve is coupled via a freewheel to the drive shaft, and wherein the first rotary slide valve is set to a first setpoint value and the second rotary slide valve is set to a second setpoint value by the servomotor, wherein the freewheel engages the second rotary slide valve when the drive shaft rotates in a first direction and decouples the second rotary slide valve when the drive shaft rotates in a second direction, and wherein the freewheel is coupled to the drive shaft only indirectly via the first rotary slide valve.

18. The method according to claim 17, wherein first the second rotary slide valve is set by rotating the drive shaft against a freewheeling direction of the freewheel and then the first rotary slide valve is set by rotating the drive shaft in the freewheeling direction.

19. The method according to claim 17, wherein to set the second rotary slide valve to the second setpoint value, the servomotor is operated to alternately set the first rotary slide valve in opposite directions to values deviating from the first setpoint value until the second setpoint value for the second rotary slide valve is present.

* * * * *